Jan. 30, 1962 F. F. LADD, JR 3,019,374
ELECTRICAL APPARATUS
Filed Sept. 29, 1958
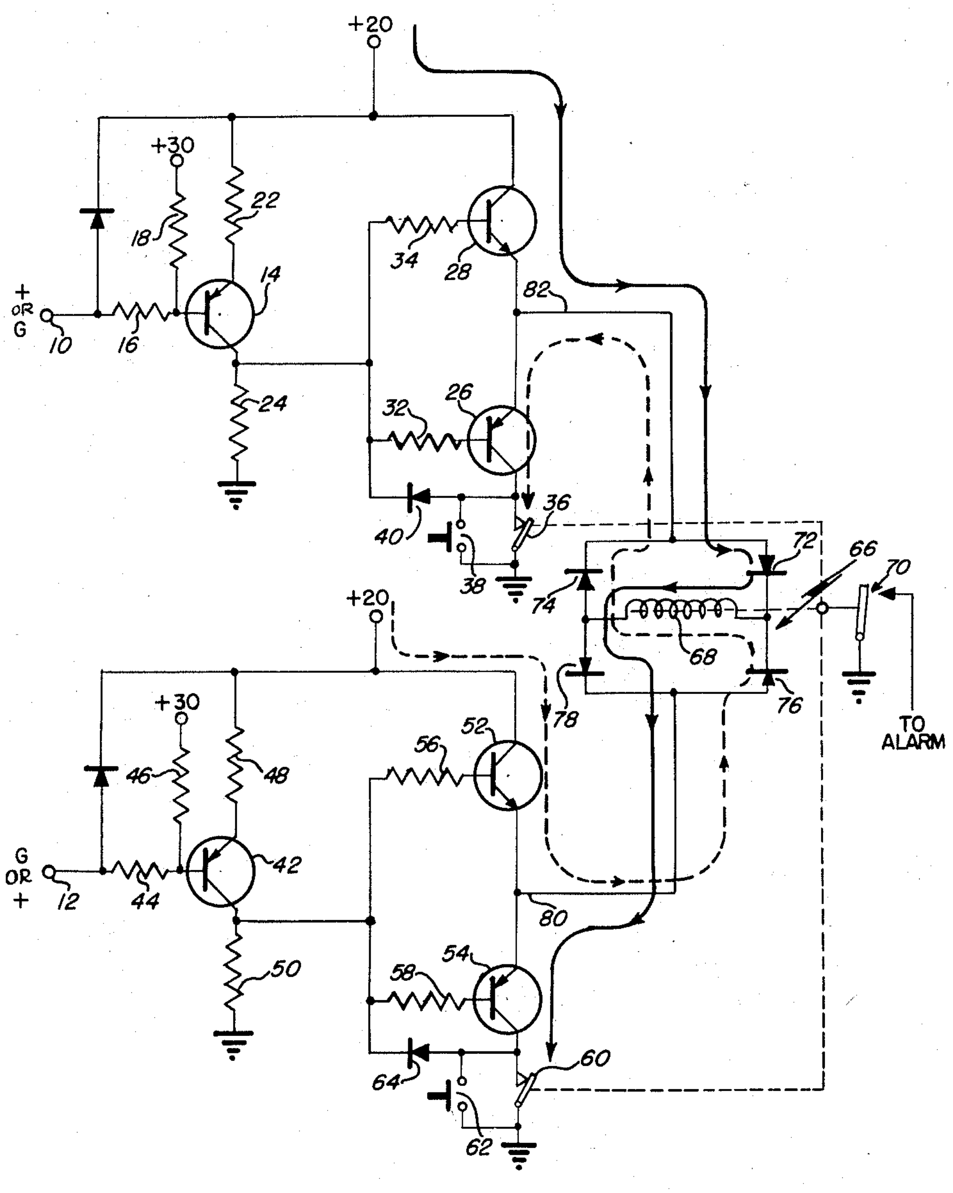
INVENTOR.
FREDERICK F. LADD, JR
BY Henry L. Hanson
ATTORNEY United States Patent Office 3,019,374
Patented Jan. 30, 1962

3,019,374
ELECTRICAL APPARATUS

Frederick F. Ladd, Jr., Amesbury, Mass., assignor to Minneapolis-Honeywell Regulator Company, Minneapolis, Minn., a corporation of Delaware Filed Sept. 29, 1958, Ser. No. 764,055
5 Claims. (Cl. 317—148.5)

A general object of the present invention is to provide a new and improved electrical apparatus for operating a relay under preselected input signal combinations. More specifically, the present invention is concerned with a new and improved transistorized relay control circuit characterized by its ability to maintain current flowing through the control winding of the control relay only so long as selected input signal combinations are present on the input thereof.

The present invention is of particular value in the monitoring of the operation of electrical data processing circuits. In a representative form of data processing circuit, the circuit may be monitored by a pair of output terminals with the signals on such terminals, under conditions of proper operation, always being of an opposite electrical state. As long as both of the signals change state, and change at the same time, the signal monitoring circuit will continue to indicate proper operation. If, however, the input signals do not change electrical state at the same time so that in one particular instance the signals are of the same electrical state, it is desired that an alarm condition be indicated. The monitoring of such a circuit has been achieved in the present invention by a new and improved transistorized relay control circuit arranged so that even though the signals on a pair of input terminals on the circuit monitor may be reversed in state, and are of an opposite state, the current which flows in the output of this monitoring circuit will always be in the same direction. Thus, this current flow in the output may be used in conjunction with a control relay, which relay will remain energized until such time as the current ceases to flow as the result of an input signal condition indicating like electrical states of a pair of input signals or upon an internal circuit failure in the monitoring circuit.

In the circuitry of the present invention, two pairs of transistor circuits are utilized to control the current flowing through the output relay. The transistors of each pair are of opposite conductivity type to thereby provide for an easy means for reversing current flow in the output. Cooperating with these transistor circuits is a unique diode circuit which insures that even though the current in the output circuit may reverse in direction, the current flowing through the winding of the output control relay is always in the same direction. This condition will exist only so long as the proper combination of input signals to the monitoring circuits exist. Once an alarm condition is indicated, the circuit must "lock out" to maintain optimum safety and protection.

It is therefore a further more specific object of the present invention to provide a new and improved signal monitoring circuit comprising two pairs of transistor circuits, each pair of which is formed of opposite conductivity type transistors, and with a relay control winding connecting the output circuit between the two pairs of transistors so that the associated relay will remain energized only so long as the input signals in the circuit are of a preselected combinational type.

Another more specific object of the invention is to provide a new and improved transistorized relay control circuit wherein the relay controlled by the circuit is utilized to effect a lockout in the circuit in the event that an alarm condition should be indicated.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Referring to the single figure, numerals 10 and 12 identify two input terminals which are adapted to be connected to an appropriate circuit being monitored. When such circuit is operating properly, it is assumed that electrical states on the terminals 10 and 12 will be opposite. Thus, if there is a positive signal on the terminal 10, the signal on the terminal 12 will be a ground potential. Conversely, if there is a ground on the terminal 10, the potential on the terminal 12 will be positive. Obviously, the type of signal in terms of relative magnitude and polarity will be a direct function of the type of circuitry connected therethrough.

The input terminal 10 is connected to a transistor 14 at the base electrode thereof by way of a resistor 16. Also connected to the base electrode of the transistor 14 is a positive power supply source which may be, for example, a +30-volt source. Included in this last named connection is a resistor 18. The emitter-collector circuit of the transistor 14 is coupled to a suitable 20-volt power source by way of an emitter resistor 22 and a collector or load resistor 24.

The output of the transistor 14 is coupled to control the current flowing through a pair of series connected transistors 26 and 28. The transistor 26 is of the PNP type while the transistor 28 is of the NPN type. Isolating resistors 32 and 34 are associated with the respective base electrodes of the transistors 26 and 28. The transistors 26 and 28 are connected in series in their emitter-collector circuits. The collector electrode of the transistor 28 is connected to a further positive potential terminal indicated here as a +20-volt supply terminal, while the collector electrode of the transistor 26 is connected to ground by way of a lockout switch 36. Connected in parallel with the lockout switch 36 is a suitable reset switch 38. A diode 40 is connected between the collector of the transistor 26 and the base electrode resistor 32.

The input terminal 12 is connected to a circuit which is basically identical to that to which terminal 10 is connected. In this instance, a transistor 42 is provided and the base electrode thereof is connected to the terminal 12 by way of a coupling resistor 44. The base electrode of the transistor 42 is coupled to the +30-volt power supply terminal by way of a further resistor 46. The emitter-collector circuit of the transistor 42 is coupled to the +20-volt supply terminal by way of an emitter resistor 48 and a collector or load resistor 50, the latter being connected to ground at the terminal opposite the collector.

The output of the transistor 42 at the collector electrode thereof is coupled to a further pair of the transistors 52 and 54. The transistor 52 is of the NPN type while the transistor 54 is the PNP type. A resistor 56 couples the output of the transistor 42 to the base electrode of the transistor 52 while a resistor 58 couples the output of the transistor 42 to the base electrode of the transistor 54. The emitter-collector circuits of the transistors 52 and 54 are connected in series with the collector of the transistor 52 being connected to the +20-volt supply terminal while the collector of the transistor 54 is coupled to the ground terminal by way of a lockout switch 60. Connected in parallel with the lockout switch 60 is a reset switch 62. A diode 64 is connected from the collector of the transistor 54 to the base resistor 58.

The output of the two above described circuits are used to control the current flowing through an output relay circuit 66, the latter comprising a relay winding 68, an alarm contact 70, as well as the lockout contacts 36 and 60. Connecting the outputs of the transistors 26 and 28 to the relay winding 68 are a pair of diodes 72 and 74. Connecting the outputs of the transistors 52 and 54 to the winding 68 are a further pair of diodes 76 and 78.

In considering the operation of the circuit described, let us first assume that a positive potential condition exists on the terminal 10 while a ground potential condition exists on input terminal 12. Under these conditions, the transistor 14 will be biased into a non-conductive region for the reason that a positive potential will exist on the base electrode thereof. The effect of transistor 14 being non-conductive in the emitter-collector circuit is to place the collector electrode thereof at a substantially ground potential. Consequently, this ground potential will be coupled to the base electrodes of the transistors 26 and 28. With the base electrode of the transistor 26 being substantially at ground, this transistor will be in a condition to conduct. The same potential on the base electrode of the transistor 28 will bias this transistor into the non-conductive state.

Inasmuch as a ground potential condition is assumed to exist on the input terminal 12, the base electrode of the transistor 42 will be dropped to a point where the transistor 42 will be conductive. When conductive, the collector-electrode of the transistor 42 will be at a potential which approaches the +20-volt power supply potential. This 20-volt signal will be applied to the base electrodes of the transistors 52 and 54. The effect of this positive potential will be to bias the transistor 52 to be conductive and to bias the transistor 54 to be non-conductive.

With the aforedescribed conductive states having been established in the transistors 26 and 52, a circuit may be traced to the output relay from the positive supply terminal for the 20-volt supply through the collector-emitter circuit of the transistor 52, lead 80, diode 76, winding 68, diode 74, lead 82, emitter-collector circuit of the transistor 26, and lockout switch 36 to ground. The last traced circuit is illustrated on the drawing with the dotted line path. As long as the current is flowing in this path from right to left through the winding 68, the control relay 66 will remain in an energized state, the alarm contact 70 will remain open, and the lockout switches 36 and 60 will remain closed.

Assume next that the electrical states on the input terminals 10 and 12 reverse so that now a ground potential will exist on the terminal 10 while a positive potential will exist on the terminal 12. The effect of this will be to reverse the electrical operating conditions in the circuit described with the exception of the direction of the current in the output flowing through the relay 68. In other words, the solid line current flow traced on the drawing will be seen to flow from right to left through the winding 68 in the same direction as the current flow traced above. Consequently, the relay 66 will remain in an energized state.

Considering this reversed electrical state more specifically, the grounded signal on the input of the transistor 14 will be effective to switch this transistor into the conductive state so that the collector electrode thereof will be approximately at the +20-volt supply source potential. The signal will then be coupled to the base electrodes of the transistors 26 and 28. In this case, however, the base electrode of the transistor 28 will be biased so that this transistor will now be conducting while the transistor 26 will be cut off.

Insofar as the input terminal 12 is concerned, with a positive potential thereon, the transistor 42 will be biased to be non-conducting. Thus, the collector electrode will be approximately at ground potential and this signal will be reflected to the transistors 52 and 54 so that in this case, the transistor 54 will be rendered conducting and the transistor 52 nonconducting.

With the circuits conducting in the aforedescribed manner, current flow circuit may be traced from a +20-volt power supply terminal through the collector-emitter circuit of the transistor 28, lead 82, diode 72, winding 68, diode 78, lead 80, transistor 54 in the emitter-collector circuit, and the lockout switch 60 to ground. As pointed out above, the current flow through the winding 68 will be in the same direction as that in the first traced circuit. Thus, the winding will maintain the relay in the energized state so that the alarm contact 70 will be open and the lockout contacts 36 and 60 will remain closed.

Assume next an error condition has been produced on the input as indicated by the input signals on the terminals 10 and 12 being of the same electrical state. Thus, if both of the input terminals 10 and 12 should be connected to a positive potential at the same time, both of the transistors 14 and 42 will be rendered non-conducting. Consequently, both the transistors 26 and 54 will be biased to be conducting. However, it will be apparent that there will be no low impedance current flow circuit which will be capable of producing a holding or sustaining current through the winding 68 of the relay 66. Thus, the relay 66 will become de-energized, the contact 70 will close to operate an appropriate alarm circuit, and the lockout contacts 36 and 60 will open. The circuit will remain in this locked-out state until such time as the electrical conditions on the inputs 10 and 12 are of an opposite electrical state and until the reset buttons 38 and 62 have been closed to momentarily complete the current flow circuits for the relay winding 68. The switch which is effective will depend upon whether initial conduction for the winding 68 will be by way of the transistor 26 or the transistor 54 at the start immediately following reset. Obviously, the switches 36 and 60, as well as the reset switches, may be combined in a single combination. The diode 40, connected between the collector and base electrodes by way of the resistor 32, serves to maintain a protective bias on the transistor 26 when the relay switch 36 is open. In the absence of the diode, the opening of the switch 36 will tend to throw an excessive base current on the transistor. The diode, however, which will be biased in the forward direction under a conductive condition, will maintain the collector circuit active so that an excessive current will not flow in the base circuit. Diode 64 functions in a similar manner with respect to transistor 54. In both transistors 26 and 54 when the respective switches open, the current will be able to flow in the collector circuits through the diodes and the respective resistors 24 and 50. Then resistors are selected to be of a size to maintain this current flow at a level less than that which will hold the relay 66 energized.

From the foregoing description it will be seen that there has been provided a new and improved transistorized control circuit for an alarm relay. It will be further apparent that the circuit transistors may be reversed in their respective conductivity types so long as the potentials in the circuit therefor are appropriately reversed and the signals associated therewith are reversed, as is well known in the art.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

What is claimed is:

1. An electrical circuit comprising a first pair of transistors of opposite conductivity types, each of said transistors having base, emitter, and collector electrodes, means connecting the emitter-collector circuits of said first pair of transistors in a series circuit to a power supply means, a second pair of transistors of opposite conductivity types, each of said transistors having base, emitter, and collector electrodes, means connecting the emitter-collector circuits of said second pair of transistors in a series circuit to said power supply means, a signal source means connected to the base electrodes of the transistors of said first and second pair of transistors, a relay having a control winding connected between the connecting junctions of said first and second pair of transistors, and diode means connected to said relay winding to limit the current flow through said winding to a single direction which is independent of the direction of the current flow originating from said first and second pair of transistors.

2. An electrical alarm circuit comprising first and second NPN transistors, first and second PNP transistors, means connecting said first NPN transistor and said first PNP transistor in a first series circuit, a power source, means including relay contact means connecting said first series circuit to said power source, a second series circuit comprising said second NPN transistor and said second PNP transistor, means including said relay contact means connecting said second series circuit to said power source, a control relay including said relay contact means and a winding for actuating said contact means, circuit means connecting said winding between the junction point between said first transistors and the junction point of said second transistors, a first pair of diodes connected in a first direction in said circuit means to direct current through said winding in predetermined direction, and a second pair of diodes connected in a second direction in said circuit means to direct current through said winding in said predetermined direction.

3. In combination, a first pair of transistors of opposite conductivity type connected in a first series circuit, a second pair of transistors of opposite conductivity type connected in a second series circuit, a relay having a control winding, a first current flow circuit connected to said control winding, said first circuit comprising one of said first pair of transistors of a first conductivity type, one of said second pair of transistors of a second conductivity type, and a first pair of diodes whose impedance is low in the direction of current flowing in said first current flow circuit, a second current flow circuit connected to said control winding, said second circuit comprising the other of said first pair of transistors, the other of said second pair of transistors, and a second pair of diodes whose impedance is low in the direction of current flowing in said second current flow circuit.

4. In combination, a first pair of transistors of opposite conductivity type connected in a first series circuit, a second pair of transistors of opposite conductivity type connected in a second series circuit, a relay having a control winding and switch means controlled thereby, a first current flow circuit connected to said control winding, said first circuit comprising one of said first pair of transistors of a first conductivity type, one of said second pair of transistors of a second conductivity type, and a first pair of diodes whose impedance is low in the direction of current flowing in said first current flow circuit, a second current flow circuit connected to said control winding, said second circuit comprising the other of said first pair of transistors, the other of said second pair of transistors, and a second pair of diodes whose impedance is low in the direction of current flowing in said second current flow circuit, and means connecting said switch means in both of said current flow circuits to open said circuits in the event of relay de-energization to drop the current flow below that required to maintain said relay energized.

5. In combination, a first pair of transistors of opposite conductivity type connected in a first series circuit, a second pair of transistors of opposite conductivity type connected in a second series circuit, a relay having a control winding, a first current flow circuit connected to said control winding, said first circuit comprising one of said first pair of transistors of a first conductivity type, one of said second pair of transistors of a second conductivity type, and a first pair of diodes connected on opposite sides of said winding and whose impedance is low in the direction of current flowing to said control winding, said second circuit comprising the other of said first pair of transistors, the other of said second pair of transistors, a second pair of diodes connected on opposite sides of said winding and whose impedance is low in the direction of current flowing in said second current flow circuit, first switch means controlled by said control winding connected in series with said first and second pair of transistors, and reset means comprising a manual switch connected in parallel with said first switch means.

References Cited in the file of this patent

UNITED STATES PATENTS

| | | |
|---|---|---|
| 2,838,675 | Wanlass | June 10, 1958 |
| 2,864,978 | Frank | Dec. 16, 1958 |
| 2,894,180 | Price | July 7, 1959 |
| 2,907,931 | Moore | Oct. 6, 1959 |